Jan. 24, 1950
H. R. CRAGO
2,495,226
AUTOMATICALLY REVERSIBLE REGULATING VALVE
Filed Oct. 30, 1945
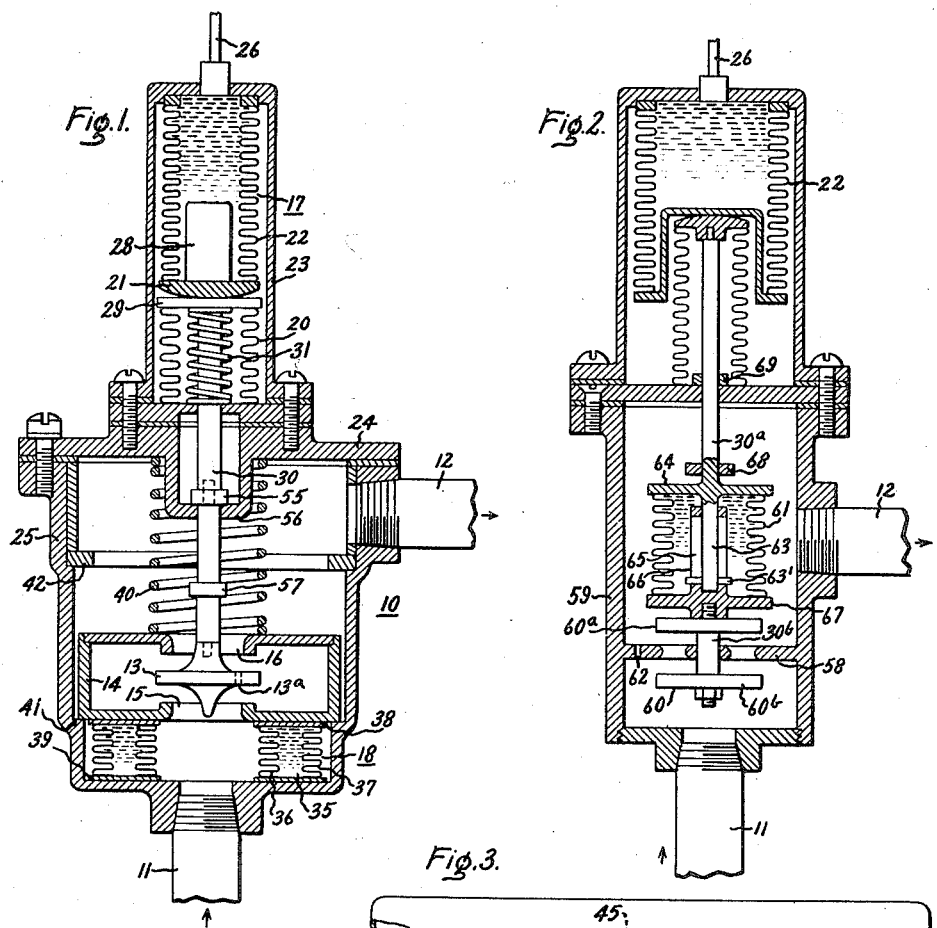
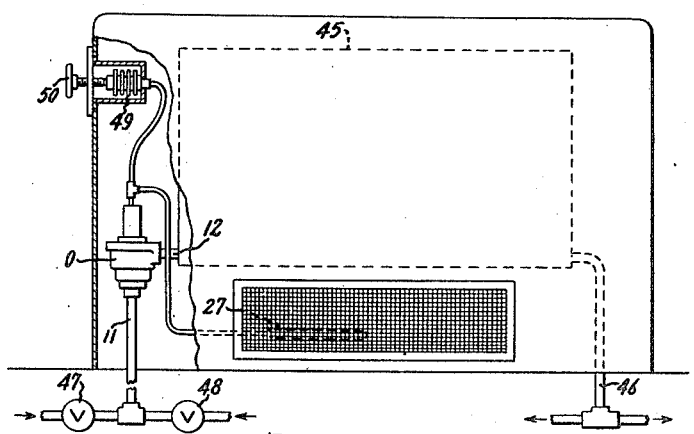
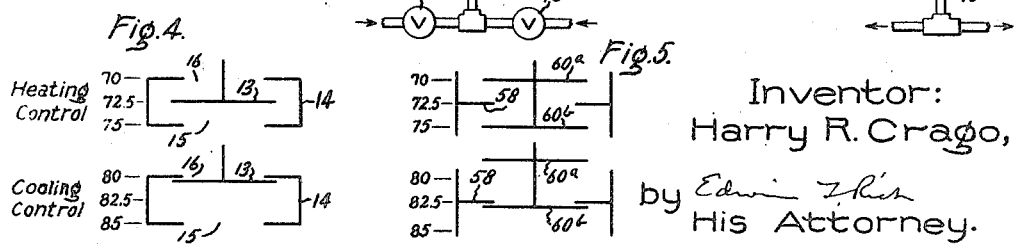
Inventor:
Harry R. Crago,
by Edwin T. Rich
His Attorney.

Patented Jan. 24, 1950

2,495,226

UNITED STATES PATENT OFFICE 2,495,226

AUTOMATICALLY REVERSIBLE REGULATING VALVE

Harry R. Crago, Schenectady, N. Y., assignor to General Electric Company, a corporation of New York Application October 30, 1945, Serial No. 625,564

8 Claims. (Cl. 236—1)

The invention relates to automatically reversible regulating valves and particularly to thermostatic valves of the temperature responsive reversible regulation type disclosed and claimed in my Patent 2,121,625.

One object is to provide an improved form of automatically reversible thermostatic valve mechanism specially adapted for controlling a temperature condition involving both heat loss and heat gain by reversely regulating the flow of heating and cooling medium in a reversible heat exchange system.

Another object is to provide an improved automatic direct acting reversible regulating valve mechanism having a converse flow regulating position intermediate a pair of like flow regulating positions and adapted for dual condition responsive reversible regulation service to enable the flow to be either increased or decreased in accordance with like variations of a predetermined condition dependent upon the variation of another condition that controls the reversal of the flow regulation.

Another object is to provide an improved dual thermomotive actuated reversible regulating valve mechanism having opposite thermostatic flow regulating actions dependent upon the temperature of the medium controlled thereby.

A general object is to provide an improved form of self-reversing regulating valve mechanism having interacting valve members relatively movable into reversed flow regulating relations in a single flow path with a pair of separate condition responsive actuating devices jointly controlling the relative flow regulating movements of the valve members so that one of the devices can reverse the flow regulating action of the other.

While not limited thereto, the improved automatically reversible valve mechanism of the present invention is particularly advantageous in a year-'round room temperature control system for modulating the flow to a room heating and cooling reversible heat exchanger that is supplied with heated medium in winter and cooled medium in summer. For such service the invention provides an improved single flow path dual thermomotive direct acting reversing valve unit that can regulate the flow of the medium to the reversible heat exchanger reversely in accordance with like variations in the room temperature in summer and in winter. Thus in maintaining a desired room temperature in winter the valve automatically decreases the flow of the heated medium to the heat exchanger as the room temperature increases and vice versa. But when cooled medium is supplied to the heat exchanger in summer the room temperature responsive thermomotive actuating device is automatically reversed in its thermostatic flow regulating action by the medium temperature responsive thermomotive actuating device so as to increase the flow of cooled medium to the heat exchanger as the room temperature increases and vice versa.

A further object of the present invention is to provide means for automatically shifting the condition responsive control range of the improved valve upon each reversal of the flow regulation thereof. Thus when applied in a conventional year-'round room thermostatic temperature control system the improved reversible valve is able to shift automatically between a relatively low thermostatic control range desirable for controlling the flow of heating medium as from 70 to 75 degrees F. and a higher thermostatic control range desirable for controlling the flow of a cooling medium, as from 80 to 85 degrees F. Furthermore, both the low and high control ranges may be adjusted as desired by manual control.

Further objects and advantages of the present invention will appear in the following description of the accompanying drawings in which Fig. 1 is a sectional view of one form of dual thermomotive actuated automatically reversible regulating valve mechanism embodying the improvements of the present invention; Fig. 2 is a sectional view of another form of automatically reversible valve mechanism embodying the invention, Fig. 3 is a schematic view, partly in section, of a room temperature controlling reversible heat exchanger that may be supplied with either heating or cooling medium under the automatic reversible thermostatic control of the improved regulating valves shown in Figs. 1 and 2, and Figs. 4 and 5 are charts schematically showing the relative positions of the valve members of Figs. 1 and 2 respectively under different temperature conditions.

In Fig. 1 the improved automatically reversible valve mechanism is indicated generally by the reference character 10 and is shown connected between a flow inlet pipe 11 and a flow outlet pipe 12 to provide a single flow regulating path therebetween. The flow is regulated by the relatively movable interacting valve members 13 and 14 which in accordance with the present invention are specially formed and arranged to automatically reverse the flow regulation upon relative movement thereof in the same direction.

For this purpose the valve port member 14 is relatively movable and provided with two ports 15 and 16 disposed in opposing spaced apart relation and in reversed flow regulating relation with the relatively movable valve closure member 13. Thus the valve closure member 13 can selectively cooperate with each of the spaced apart ports 15 and 16 to oppositely regulate the flow upon relative movement of members 13 and 14 in the same direction in the single flow path extending between the inlet pipe 11 and the outlet pipe 12. With such reversible regulating construction of the valve members 13 and 14 the open position is intermediate two closed positions with the result that the single flow path of valve 10 can be opened and then closed upon continued relative movement of the valve members 13 and 14 in the same direction and likewise can be reversely opened and then closed upon opposite continued relative movement in the same direction.

In accordance with the present invention a pair of automatic separate condition actuating devices 17 and 18 are connected jointly to control the relative movement of the flow regulating valve members 13 and 14 so that one actuating device can reverse the flow regulating action of the other. As shown in Fig. 1 the two automatic separate condition responsive actuating devices 17 and 18, each are in the form of thermomotive devices. The actuating device 17 comprises an expansible liquid filled bellows 22 operating within the casing 23 with the casing 23 mounted together with a liquid tight sealing bellows 20 on the removable top 24 of the valve body 25. The actuating bellows 22 is connected by the tube 26 with a liquid filled bulb 27, as shown in Fig. 3, so as to expand and contract the bellows 22 in response to the variations in the temperature condition to which bulb 27 is subjected. The head 28 at the free moving end of bellows 22 is provided with a heat insulating spacer 21 for engaging with the guide plate 29 joined to sealing bellows 20 and carried on the upper end of the valve stem 30 to actuate the valve member 13 against the bias of the spring 31 that serves to maintain the guide plate 29 firmly in contact with the bellows head spacer 21. Thus a relatively powerful and accurate actuation of valve member 13 in each direction is obtained in accordance with the variations of the temperature condition to which bulb 27 is subjected.

The automatic valve actuator 18 is shown as an improved flow conducting form of expansible thermomotive device 35 having double ring bellows 36, 37 interconnected between the annular end plates 38 and 39 to form a thermostatically expansible annular flow conducting conduit. Preferably the sealed space between the double ring bellows 36 and 37 is gas filled or partially filled with a vaporizable liquid having temperature response characteristics suitable for the temperature range of the fluid medium controlled by valve 10 to which the thermomotive device 35 is to be responsive. In this way the double ring bellows thermomotive actuator 35 becomes directly responsive to variations in the temperature of the fluid flowing through the inlet 11 into the valve casing 25 since the flow must pass centrally through the ring bellows and in direct heat exchange relation therewith.

The ring bellows 35 moves the valve member 14 against the bias of spring 40 that normally tends to hold the valve member 14 in engagement with the annular bellows end plate 38 and biases the valve member 14 to engage with the motion limit stop 41 when bellows 35 is contracted by cool medium. Upon expansion of the ring bellows 35 by hot medium, the valve member 14 is moved into engagement with the opposite stop 42.

The automatically reversible thermostatic valve mechanism 10 shown in Fig. 1 may be applied to control the flow of heating and cooling medium to a room air conditioning unit in the manner indicated schematically in Fig. 3. As shown the valve 10 is connected to regulate the flow from a common heating and cooling medium supply pipe 11 through the pipe connection 12 to a reversible heat exchanger 45 having a suitable outlet or return pipe 46. Heating medium from a source, not shown, is admitted to the supply pipe 11 upon opening of the valve 47 while cooling medium from a source, not shown, is admitted to the supply pipe 11 upon opening of the valve 48. The room temperature responsive bulb 27 may be located in the path of the incoming room air to the heat exchanger 45 so as to be sensitive to variations of the temperature of the room air independently of the temperature of the heat exchanger. To enable manual adjustment of the room temperature to be obtained, an auxiliary expansible bellows 49 is provided with a manual adjusting knob 50 operating preferably through the usual over-temperature safety spring (not shown) with the bellows 49 liquid filled and interconnected in a closed and sealed system with bulb 27 and the actuating bellows 22 of valve 10 in the usual manner.

*Operation of valve shown in Fig. 1*

Since the valve port member 14 is shown in engagement with stop 41, the ring bellows 35 is contracted for cooling operation and cooling medium is being supplied through the supply pipe 11. Since the valve closure member 13 is shown in the full open position midway between the two valve ports 15 and 16, the bellows 22 is expanded by the response of the liquid in the closed system including bulb 27 to a relatively high room temperature. Thus during cooling operation the relatively movable valve members 13 and 14 are in their relative positions, as shown in Fig. 1, and provide the maximum flow of cooling medium to the heat exchanger 45 in order to reduce the relatively high temperature of the room air to which the bulb 27 is responsive.

During cooling operation as the room air temperature decreases, bellows 22 contracts thereby effecting a relative movement of the valve closure member 13 towards the port 16 with a resulting decrease in the flow of the cooling medium to the heat exchanger 45. In case the room air temperature should fall below the cooling temperature control range within which cooling is desired, then the valve member 13 will close the port 16 to stop further supply of cooling medium to the heat exchanger 45 except for the relatively small amount passing through the by-pass opening 13a formed in valve member 13 to insure continued response of bellows 35 to the temperature of the cooling medium. Thus during cooling operation bellows 22 is actuated in response to variations of the room temperature as sensed by bulb 27 to variably position the valve member 13 with respect to port 16 so as to provide thermostatic control of the room temperature within the cooling control temperature range. In case the room temperature increases, the valve member 13 moves away from port 16 to increase the flow of cooling medium and vice versa with the range of relative movement of valve member 13 extending from the full open position in which it is shown in Fig. 1 to the position in which it closes port 16 except for by-pass 13a.

As indicated in the schematic chart of Fig. 4, the valve member 13 may during cooling operation substantially close port 16 when the room air temperature falls to 80° F. or below and be in the full open position for maximum flow of cooling medium when the room air temperature rises to 82.5° F. At intermediate room air temperatures the valve member 13 will be positioned to modulate the flow of cooling medium proportionately to the variation of the room temperature within the limited cooling control range.

In order to prevent movement of the valve member 13 beyond the full open position towards port 15 during cooling operation, the valve stem 30 preferably is provided with a stop 55 for engaging with the valve stem guide yoke 56 so as to limit the downward motion of the valve stem. This insures that even though the room temperature should exceed the normal cooling temperature control range, still the valve member 13 cannot move beyond the full open position so as to improperly restrict the maximum flow of cooling medium.

Heating operation results automatically when heating medium is supplied through the supply pipe 11 to valve 10. The ring bellows 35 will respond to the increased temperature of the heating medium and expand, thus effecting a relative movement of the valve port member 14 with respect to valve closure member 13 such that the valve port member 14 is moved out of engagement with stop 41 and into engagement with stop 42. This not only reverses the flow regulating relation of the valve members 13 and 14 but also automatically shifts from the cooling range of thermostatic response for the room temperature responsive bellows 22 to the heating control range therefor. Thus in case the room air temperature should happen to be above the normal heating temperature control range, then valve member 13 will close port 15 except for bypass 13a to prevent the flow of heating medium to the heat exchanger 45. When the room temperature falls within the normal heating control range, the liquid filled thermomotive system including bulb 27 and bellows 22 will contract the latter so as to move valve member 13 away from port 15 to admit heating medium to the heat exchanger 45. For example, as shown in the chart of Fig. 4, in the heating control range valve 13 will move away from port 15 when the room temperature decreases below 75° F. and will reach the full open mid position when the room temperature falls to 72.5° F. This provides a 2.5° F. thermostatic modulating heating control temperature range capable of effecting relatively accurate control of the room temperature. The valve stem 30 preferably is provided with a stop 57 for engaging with the valve stem guide bracket 56 to prevent movement of the valve member 35 beyond the full open mid position in case the room temperature should ever fall below the lower limit 72.5° F. of the heating control range.

It will be observed from the chart of Fig. 4 that in the illustrative example given, the valve ports 15 and 16 are indicated as spaced apart twice the distance of the limited relative movement of the valve members 13 and 14 in both the heating and cooling ranges. Also that the stops 41 and 42 are spaced apart to provide for relative movement of valve member 14 a distance corresponding to four times the relative movement of the valve members in each range. It will be understood, however, that in case a greater or less automatic shift between the heating and cooling thermostatic control ranges is desired or a greater or less relative movement of the valve members in each range is desired, then the stops 41, 42 and the limiting stops 55, 57 as well as the distance between the ports 15 and 16 may be correspondingly changed to provide the desired operating characteristics.

In the modified form of automatically reversible valve mechanism embodying the invention as shown in Fig. 2, a single port valve member 58 is provided in the valve casing 59 and the thermomotive bellows 61 is inserted between the separated parts of the valve stem 30a and 30b so as to effect relative movement of the double disk valve member 60 jointly with the room temperature responsive bellows 22. In this modification it will be noted that there is a single flow path between the inlet pipe 11 and the outlet pipe 12 extending through casing 59 substantially the same as shown in Fig. 1. A by-pass 62 is provided to enable the thermomotive bellows 61 to respond directly to the temperature variation of the medium supplied through pipe 11. Such response is obtained even though the valve is closed since a minimum flow will continue through the restricted valve by-pass orifice 62 formed in the valve port member 58.

*Operation of valve shown in Fig. 2*

Assuming that the valve structure shown in Fig. 2 is applied as indicated in Fig. 3, the medium temperature responsive bellows 61 will be contracted as shown in response to the flow of cooling medium through the supply pipe 11. The valve port 58 is fully open as shown midway between the two opposing valve disks 60a and 60b so that the maximum flow of cooling medium is passing to the room heat exchanger 45. With the thermomotive bellows 61 contracted, the stop pin 63' carried by the arm 63 extending from the upper bellows head 64 rests in the bottom of the slot 65 formed in the arm 66 extending from the lower bellows head 67, thus limiting the contraction of bellows 61 to a predetermined amount with a corresponding relative positioning of the valve stem parts 30a and 30b.

When the room air temperature decreases due to the maximum flow of cooling medium to the heat exchanger 45, bulb 27 will respond to the decrease in room temperature and cause bellows 22 to contract thereby effecting a relative movement of valve member 60 from the full open position in which it is shown in Fig. 2 to advance disk 60b towards the port 58. As a result, the flow of cooling medium will be reduced and modulated to the amount required to maintain the room temperature within the desired cooling temperature control range. The cooling temperature control range may be the same as previously described so that valve member 60 will be in the full open position when the room temperature is 85° F. and in the full closed position for the cooling range when the room temperature falls below 82.5° F. In this way within such limited cooling range, the bellows 22 positions the valve member 60 so as to modulate the flow of cooling medium directly in accordance with the increase and decrease of the room temperature.

Assuming now that the room temperature falls into the heating control range and that heating medium is supplied to the pipe 11, then thermomotive bellows 61 will expand until the stop pin 63' engages with the upper end of the slot 65 and thereby effect a relative movement of the valve members 58 and 60 to reverse the thermostatic control produced by the room temperature sensitive bellows 22 and at the same time shift to the heating range of control.

Within the heating control range, which may be the same as that previously described with the length of slot 65 corresponding to the distance between the stops 41 and 42 and the distance between the spaced apart valve disks 60a and 60b substantially the same as between the ports 15 and 16 previously described, then valve member 60 will be in the full open position in which it is shown whenever the room temperature reaches or falls below 72.5° F. As the room temperature increases due to the maximum flow of heating medium to the heat exchanger 45 then bellows 22 will expand to effect relative movement of valve member 60 from the full open position to move disk 60a towards the port 58. In this way the valve member 60 is positioned with respect to port 58 so as to modulate the flow of heating medium reversely in accordance with the increase and decrease of the room temperature. Thus the heating modulation is opposite from the cooling modulation and in a different temperature range. The stops 68 and 69 serve to limit the movement of stem 30a in the same way as stops 55 and 57 in Fig. 1.

In utilizing the improvements of the present invention in other dual condition responsive automatically reversible flow regulating service, it will be understood that the thermomotive valve actuating devices shown may be replaced by other suitable forms of automatic condition responsive devices.

What I claim as new and desire to secure by Letters Patent of the United States, is:

1. An automatic fluid flow regulating valve for effecting opposite changes in the rate of flow of the fluid in two ranges of a predetermined condition of the fluid, said valve comprising a casing having an inlet and an outlet, a port member and a port closure member in said casing, said members being movable with respect to one another and cooperating to control the flow of fluid from said inlet to said outlet, one of said members comprising two spaced elements, means dependent upon said predetermined condition of the fluid for shifting said members with respect to one another to afford cooperation of the other of said members with one of said elements in one of said ranges and with the other of said elements in the other of said ranges, and means responsive to a condition dependent upon the flow of the fluid for effecting relative movement of said members in the same sense in both of said ranges to produce opposite changes in the rate of flow of the fluid.

2. An automatic fluid flow regulating valve for effecting opposite changes in the rate of flow of the fluid in two ranges of a predetermined condition of the fluid, said valve comprising a casing having a single fluid flow path therethrough, relatively movable port and port closing members arranged in said path and cooperating to control the flow of fluid through said valve, one of said members comprising two spaced elements, means dependent upon said predetermined condition of the fluid for shifting said members with respect to one another to afford cooperation of the other of said members with one of said elements in one of said ranges and with the other of said elements in the other of said ranges, and means responsive to a condition dependent upon the flow of the fluid for regulating the relative movement of said members in the same sense in both of said ranges to effect opposite changes in the rate of flow of the fluid.

3. An automatic fluid flow regulating valve for effecting opposite changes in the rate of flow of the fluid in two ranges of temperature of the fluid, said valve comprising a casing having an inlet and an outlet, a port member and a port closure member mounted in said casing, said members being movable with respect to one another and cooperating to control the flow of fluid from said inlet to said outlet, one of said members comprising two spaced elements, means including a first thermomotive device responsive to the temperature of the fluid for shifting said members with respect to one another to afford cooperation of the other of said members with one of said elements in one of said ranges and with the other of said elements in the other of said ranges, and means including a second thermomotive device responsive to a temperature condition dependent upon the flow of the fluid for regulating the relative movement of said members in the same sense in both of said ranges to effect opposite changes in the rate of flow of the fluid.

4. An automatic fluid flow regulating valve for effecting opposite changes in the rate of flow of the fluid in two predetermined ranges of temperature of the fluid, said valve comprising a casing having an inlet and an outlet and providing a single fluid flow path therebetween, relatively movable port and port closing members arranged in said path and cooperating to control the flow of fluid from said inlet to said outlet, one of said members comprising two spaced elements, a first thermomotive means responsive to the temperature of the fluid and including a bellows for shifting one of said members with respect to the other to afford cooperation of the other of said members with one of said elements in one of said ranges and with the other of said elements in one of said ranges, and a second thermomotive means responsive to a temperature condition dependent upon the flow of the fluid and including a bellows for regulating the relative movement of said members in the same sense in both of said ranges to effect opposite changes in the rate of flow of the fluid.

5. An automatic fluid flow regulating valve for effecting opposite changes in the rate of flow of the fluid in two ranges of temperature of the fluid, said valve comprising a casing having an inlet and an outlet, a port member and a port closure member mounted in said casing for controlling the rate of fluid flow, said port member having two spaced openings, said port closure member being arranged intermediate said openings and being movable therebetween, a first thermomotive device responsive to the temperature of the fluid for positioning said port member in either of two operating ranges corresponding to said temperature ranges so that the port closure member cooperates with one of said openings in one of said operating ranges and with the other of said openings in the other of said operating ranges, and a second thermomotive device responsive to a variable temperature condition for actuating said port closure member in the same direction regardless of the temperature range whereby temperature changes in the same direction effect opposite changes of the rate of flow in said two operating ranges.

6. An automatic fluid flow regulating valve for effecting opposite changes in the rate of flow of the fluid in two predetermined temperature ranges of the fluid, said valve comprising a casing having an inlet and an outlet, a hollow valve member movably positioned in said casing between said inlet and said outlet, said member having spaced ports in opposite walls thereof for the flow of fluid therethrough, a plate valve member arranged in said hollow member intermediate said ports for movement therebetween, said plate valve member having one face adapted for cooperation with one of said ports in one of said ranges and a second face adapted for cooperation with the other of said ports in the other of said ranges, a first thermomotive device responsive to the temperature of the fluid for positioning said hollow valve member in either of two operating ranges corresponding to said temperature ranges to effect cooperation of said one face with said one port in one of said operating ranges and said other face with said other port in the other of said ranges, and a second thermomotive device responsive to a variable temperature condition for actuating said port valve member in the same direction regardless of the temperature range whereby temperature changes in the same direction effect opposite changes of the rate of flow in said two operating ranges.

7. An automatic fluid flow regulating valve for effecting opposite changes in the rate of flow of the fluid in two ranges of temperature of the fluid, said valve comprising a casing having an inlet and an outlet, a port member and a port closure member in said casing for controlling the rate of flow of fluid through said casing, said port closure member having two spaced elements arranged on opposite sides of said port member for relative movement therewith, a first thermomotive device responsive to the temperature of the fluid for positioning said port closure member in either of two operating ranges corresponding to said temperature ranges so that one of said port closure elements cooperates with one side of said port member in one of said operating ranges and the other of said port closure elements with the other side of said port member in the other of said operating ranges, and a second thermomotive device responsive to a variable temperature condition for actuating said port closure member in the same direction regardless of the temperature range whereby temperature changes in the same direction effect opposite changes of the rate of flow in said two operating ranges.

8. An automatic fluid flow regulating valve for effecting opposite changes in the rate of flow of the fluid in two ranges of temperature of the fluid, said valve comprising a casing having an inlet and an outlet, a partition member arranged across said casing between said inlet and said outlet, said partition member having a port for the passage of fluid therethrough, a port closure member mounted for longitudinal movement in said casing, said member having two spaced elements adjacent one end thereof and arranged on opposite sides of said partition member for relative movement therewith, a first thermomotive device responsive to the temperature of the fluid for positioning said port closure member in either of two operating ranges corresponding to said temperature ranges so that one of said port closure elements cooperates with one side of said port in one of said operating ranges and the other of said port closure elements with the other side of said port in the other of said operating ranges, and a second thermomotive device responsive to a variable temperature condition for actuating said port closure member in the same direction regardless of the temperature range whereby temperature changes in the same direction effect opposite changes of the rate of flow in said two operating ranges.

HARRY R. CRAGO.

REFERENCES CITED

The following references are of record in the file of this patent:

UNITED STATES PATENTS

| Number | Name | Date |
|---|---|---|
| 1,530,917 | Snediker | Mar. 24, 1925 |
| 1,771,170 | Eule | July 22, 1930 |
| 2,064,175 | Otto | Dec. 15, 1936 |
| 2,232,580 | Klinker | Oct. 26, 1943 |